(12) United States Patent
Sako et al.

(10) Patent No.: US 7,213,155 B2
(45) Date of Patent: May 1, 2007

(54) RECORDING MEDIUM, RECORDING AND/OR REPRODUCING METHOD FOR RECORD MEDIUM, AND RECORDING AND/OR REPRODUCING DEVICE FOR RECORDING MEDIUM

(75) Inventors: Yoichiro Sako, Tokyo (JP); Tatsuya Inokuchi, Kanagawa (JP)

(73) Assignee: Sony Corporation (JP)

(*) Notice: Subject to any disclaimer, the term of this patent is extended or adjusted under 35 U.S.C. 154(b) by 861 days.

(21) Appl. No.: 10/089,478

(22) PCT Filed: Jul. 31, 2001

(86) PCT No.: PCT/JP01/06581
§ 371 (c)(1),
(2), (4) Date: Mar. 28, 2002

(87) PCT Pub. No.: WO02/11139

PCT Pub. Date: Feb. 7, 2002

(65) Prior Publication Data
US 2002/0154771 A1 Oct. 24, 2002

(30) Foreign Application Priority Data
Jul. 31, 2000 (JP) ............................. 2000-231984

(51) Int. Cl.
G06F 12/00 (2006.01)
G11C 7/00 (2006.01)

(52) U.S. Cl. .................. 713/189; 713/193; 380/45; 380/277; 380/278; 369/24.01; 369/275.4

(58) Field of Classification Search ................ 713/189, 713/193; 726/26–28; 369/47.47, 47.28, 369/275.3, 275.5, 47.11, 53.21, 53.28, 24.01, 369/275.4; 710/36; 717/170; 380/43, 277–279, 380/45, 281

See application file for complete search history.

(56) References Cited

U.S. PATENT DOCUMENTS 5,081,677 A * 1/1992 Green et al. ................ 380/281
5,850,382 A * 12/1998 Koishi et al. ............. 369/275.3
6,049,878 A * 4/2000 Caronni et al. ................ 726/3
6,058,086 A * 5/2000 Yeo et al. ................ 369/53.21
6,069,956 A * 5/2000 Kurihara ...................... 380/212
6,411,574 B1 * 6/2002 Su et al. .................. 369/47.11
6,453,369 B1 * 9/2002 Imamura et al. .............. 710/36
6,477,649 B2 * 11/2002 Kambayashi et al. ......... 726/27
6,496,978 B1 * 12/2002 Ito .............................. 717/170
6,523,117 B2 * 2/2003 Oki et al. .................... 713/189
6,772,340 B1 * 8/2004 Peinado et al. ............. 713/168
6,894,961 B1 * 5/2005 Osakabe .................. 369/47.28
6,938,162 B1 * 8/2005 Nagai et al. ................ 713/189
6,950,522 B1 * 9/2005 Mitchell et al. ............ 380/280

* cited by examiner

Primary Examiner—Kim Vu
Assistant Examiner—Yin-Chen Shaw
(74) Attorney, Agent, or Firm—Lerner, David, Littenberg, Krumholz & Mentlik, LLP

(57) ABSTRACT

A recording and reproducing method for a record medium including the steps of reading type information from the record medium when data is recorded to or reproduced from the record medium on which the type information is recorded; reading type information from a recording and reproducing apparatus for the record medium; comparing the type information read from the record medium with the type information read from the apparatus; and performing a recording or reproducing process for the record medium using information corresponding to the type information stored in the apparatus when the type information read from the record medium matches the type information read from the apparatus.

18 Claims, 7 Drawing Sheets

PRE-GROOVES

PRE-GROOVE
PRE-GROOVE
DISC

Fig. 6

| M1 | S1 | F1 | CONTENTS OF INFORMATION |
|---|---|---|---|
| 0 | 0 | 0 | ADDRESS OF PROGRAM AREA AND LEAD-OUT AREA |
| 1 | 0 | 0 | ADDRESS OF LEAD-IN AREA |
| 1 | 0 | 1 | SPECIAL INFORMATION 1 : WRITE POWER AT REFERENCE SPEED |
| 1 | 1 | 0 | SPECIAL INFORMATION 2 : START ADDRESS OF LEAD-IN AREA |
| 1 | 1 | 1 | SPECIAL INFORMATION 3 : LAST START ADDRESS OF LEAD-OUT AREA |
| 0 | 0 | 1 | ADDITIONAL INFORMATION 1 : SPEED RANGE, OPC PARAMETER, ERASE POWER |
| 0 | 1 | 0 | ADDITIONAL INFORMATION 2 : NOT USED (RESERVED) |
| 0 | 1 | 1 | ADDITIONAL INFORMATION 3 : NOT USED (RESERVED) |

Fig. 7

| FRAME NUMBER | CONTENTS OF FRAME |
|---|---|
| N | SPECIAL INFORMATION 1 |
| N+1 ⋮ N+9 | REGULAR ADDRESS |
| N+10 | SPECIAL INFORMAITON 2 |
| N+11 ⋮ N+19 | REGULAR ADDRESS |
| N+20 | SPECIAL INFORMATION 3 |
| N+21 ⋮ N+29 | REGULAR ADDRESS |
| N+30 | ADDITIONAL INFORMATION 1 |
| N+31 ⋮ N+39 | REGULAR ADDRESS |
| N+40 | SPECIAL INFORMATION 1 |
| N+41 ⋮ N+49 | REGULAR ADDRESS |
| N+50 | SPECIAL INFORMATION 2 |
| N+51 ⋮ | REGULAR ADDRESS |

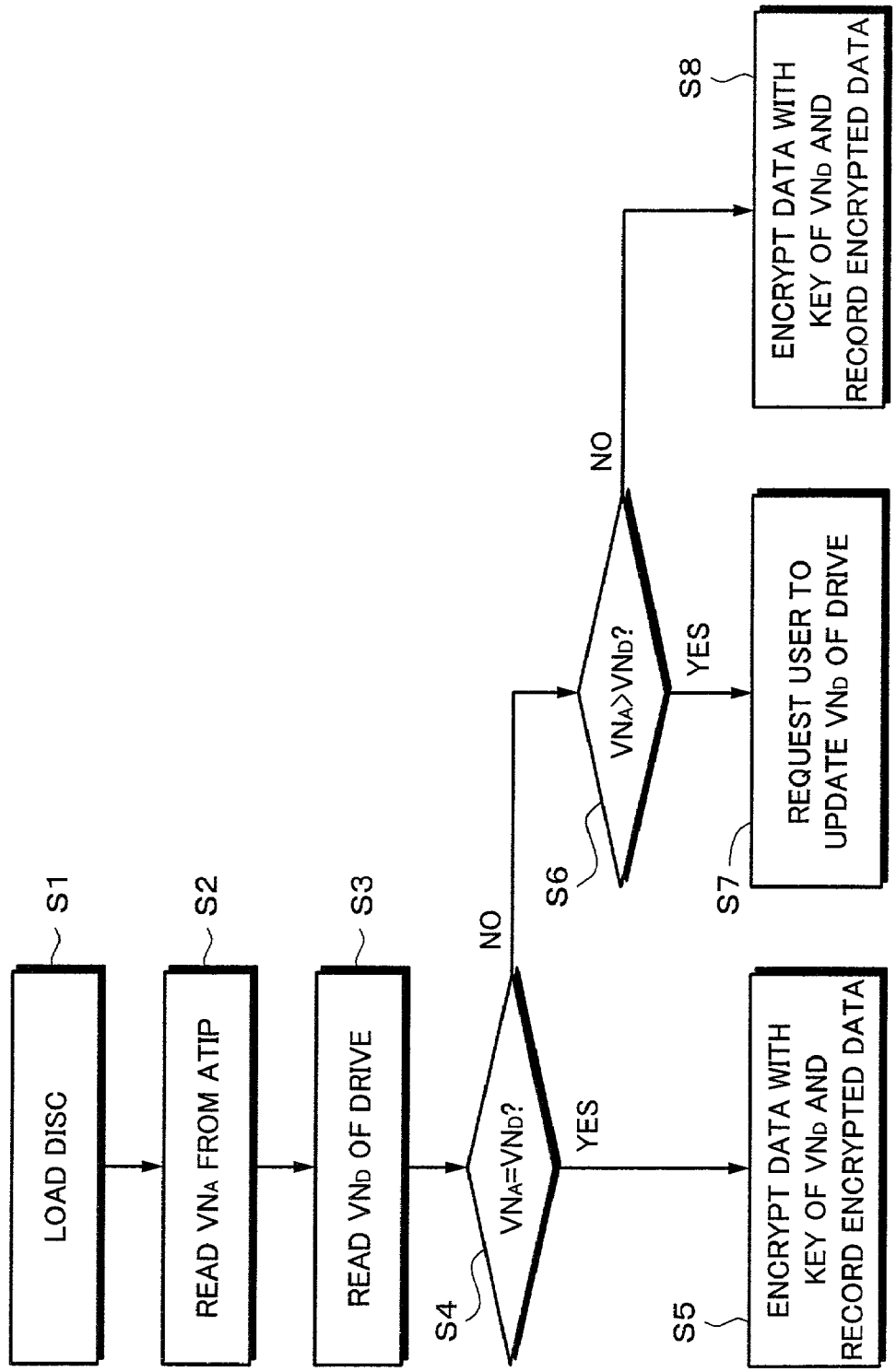

RECORDING MEDIUM, RECORDING AND/OR REPRODUCING METHOD FOR RECORD MEDIUM, AND RECORDING AND/OR REPRODUCING DEVICE FOR RECORDING MEDIUM

TECHNICAL FIELD

The present invention relates to a recordable record medium, a recording and/or reproducing method for a record medium, and a recording and/or reproducing apparatus for a record medium, in particular, to those that allow a recorded content to be copyrighted.

BACKGROUND ART

In recent years, optical discs as large capacity record mediums have been developed. For example, CD (Compact Disc) on which music data is pre-recorded, CD-ROM on which computer data is recorded, and DVD (Digital Versatile Disc or Digital Video Disc) with which video information is handled are known. These optical discs are read-only discs. Recently, optical discs such as CD-R (CD-Recordable), CD-RW (CD-Rewritable), DVD-R (DVD-Recordable), DVD+RW (DVD-Rewritable), and DVD-RAM (DVD-Random Access Memory) on which data can be written one time or data can be rewritten are being practically used.

Some contents such as video data and/or audio data recorded on data record mediums such as optical discs should be copyrighted. To copyright such contents, an encryption technology is used. In the encryption technology, besides encrypted data of content, key information composed of key information necessary for decrypting the encrypted data of content and control information for controlling a generation number of which a content can be copied is used. For example, on a read-only optical disc on which encrypted data of content has been recorded, key information has been also recorded thereon. When data is reproduced from such an optical disc using a reproducing apparatus, it reproduces the key information and decrypts the encrypted data of content using the reproduced key information.

When an optical disc is of recordable type (that means a one-time recordable optical disc or a rewritable optical disc; this definition applies to the description that follows), information can be pre-recorded in a pit form. When an optical disc has a portion in which information cannot be rewritten (hereinafter this portion is simply referred to as ROM portion), key information can be recorded to the ROM portion. With the key information, data of content is encrypted. The encrypted data of content can be recorded on the disc. As a real example, the ROM portion may be disposed at the innermost peripheral portion of the disc, a pit portion used for a track servo and formed at predetermined intervals of tracks, or the like.

A technology of which information necessary for generating key information rather than key information itself is recorded to a ROM portion has been disclosed. For example, as a technology for preventing a DVD from being illegally copied has been disclosed. In the technology, media ID data is recorded in a reproduction only region (ROM portion) formed at an innermost peripheral portion of a rewritable DVD. A hash value of the media ID data and MKB (Media Key Block) is encrypted as key data. The key data is recorded on the disc along with encrypted data of content. The media ID data is a value that is unique for each disc. In addition, since the user cannot rewrite the media ID data, even if he or she illegally copies the data portion to another disc, the media ID data of the copied disc is different from the media ID data of the original disc. Thus, it is impossible to decrypt the data portion recorded on the copied disc.

There is a probability of which a hacker illegally obtains key information. In such a case, it is necessary to update the key information to new one. Thus, whenever key information is updated, new key information is added. Consequently, the data amount of the key information in the ROM portion increases. As a result, the data record capacity of the optical disc decreases.

Since rewritable data record mediums—for example optical discs such as above-described CD-R and CD-RW—do not have a ROM portion in which key information can be recorded, the method of which key information is recorded to the ROM portion (namely, user is prohibited from rewriting key information) cannot be used. Thus, before such discs are shipped, the producer side may record key information to individual optical discs. However, in such a method, not only the data record capacity of the optical discs decreases, but the labor performed by the producer side increases. As a result, the production cost of the optical discs rises.

Therefore, an object of the present invention is to provide a record medium, a recording and/or reproducing method for a record medium, and a recording and/or reproducing apparatus for a record medium that allow updated key information not to increase a record data amount thereof.

Another object of the present invention is to provide a record medium, a recording and/or reproducing method for a record medium, and a recording and/or reproducing apparatus for a record medium that allow information such as key information necessary for decrypting data to be recorded even if a disc for use is a rewritable optical disc that does not have a ROM portion.

DISCLOSURE OF THE INVENTION

To solve the above-described problem, the invention of claim 1 is a recording and/or reproducing method for a record medium, the method comprising the steps of reading type information from the record medium when data is recorded or reproduced to or from the record medium on which at least the type information has been recorded, reading type information from a recording and/or reproducing apparatus for the record medium, comparing the type information that has been read from the record medium with the type information that has been read from the apparatus, and performing a recording or reproducing process for the record medium using information corresponding to the type information stored in the apparatus when the type information that has been read from the record medium matches the type information that has been read from the apparatus.

The invention of claim 11 is a recording and/or reproducing method for a record medium, the method comprising the steps of reading address information from the record medium when data is recorded or reproduced to or from the record medium on which the address information has been recorded, the address information including at least type information, extracting type information from the address information that has been read, reading type information from a recording and/or reproducing apparatus for the record medium, comparing the type information that has been extracted with the type information that has been read from the apparatus, and performing a recording or reproducing process for the record medium using information corresponding to the type information stored in the apparatus when the type information that has been extracted matches the type information that has been read from the apparatus.

The invention of claim 23 is a recording and/or reproducing apparatus for a record medium, the apparatus comprising a head portion for scanning the record medium on which at last type information has been recorded, a signal processing portion for supplying record data to be recorded on the record medium to the head portion and performing a decoding process for data that has been read from the record medium by the head portion, a storing portion for storing type information and information corresponding thereto, and a controlling portion for reading the type information from the record medium, reading the type information from the storing portion, comparing the type information that has been read from the record medium with the type information that has been read from the storing portion, and causing the processing portion to perform a recording or reproducing process for the record medium using information corresponding to the type information stored in the storing portion when the type information that has been read from the record medium matches the type information that has been read from the storing portion when data is recorded or reproduced to or from the record medium.

The invention of claim 32 is a record medium on which address information including type information that represents a generation of information for performing an encrypting process for at least data to be recorded has been recorded.

The invention of claim 36 is a recording and/or reproducing method for a record medium, the method comprising the steps of reading type information of key information from the record medium when data is recorded or reproduced to or from the record medium on which at least the type information of the key information has been recorded, reading type information of key information from a recording and/or reproducing apparatus for the record medium, comparing the type information that has been read from the record medium with the type information that has been read from the apparatus, and controlling a recording or reproducing operation corresponding to a compared result of the comparing step.

BRIEF DESCRIPTION OF DRAWINGS

FIG. 6 is a schematic diagram showing the content of information represented by most significant bits of one example of the address format;

FIG. 7 is a schematic diagram showing the contents of successive frames of a lead-in area of one example of the address format;

FIG. 9 is a flow chart for explaining an encrypting process of the controlling portion in the recording mode according to the embodiment of the present invention.

BEST MODES FOR CARRYING OUT THE INVENTION

Figure 1:
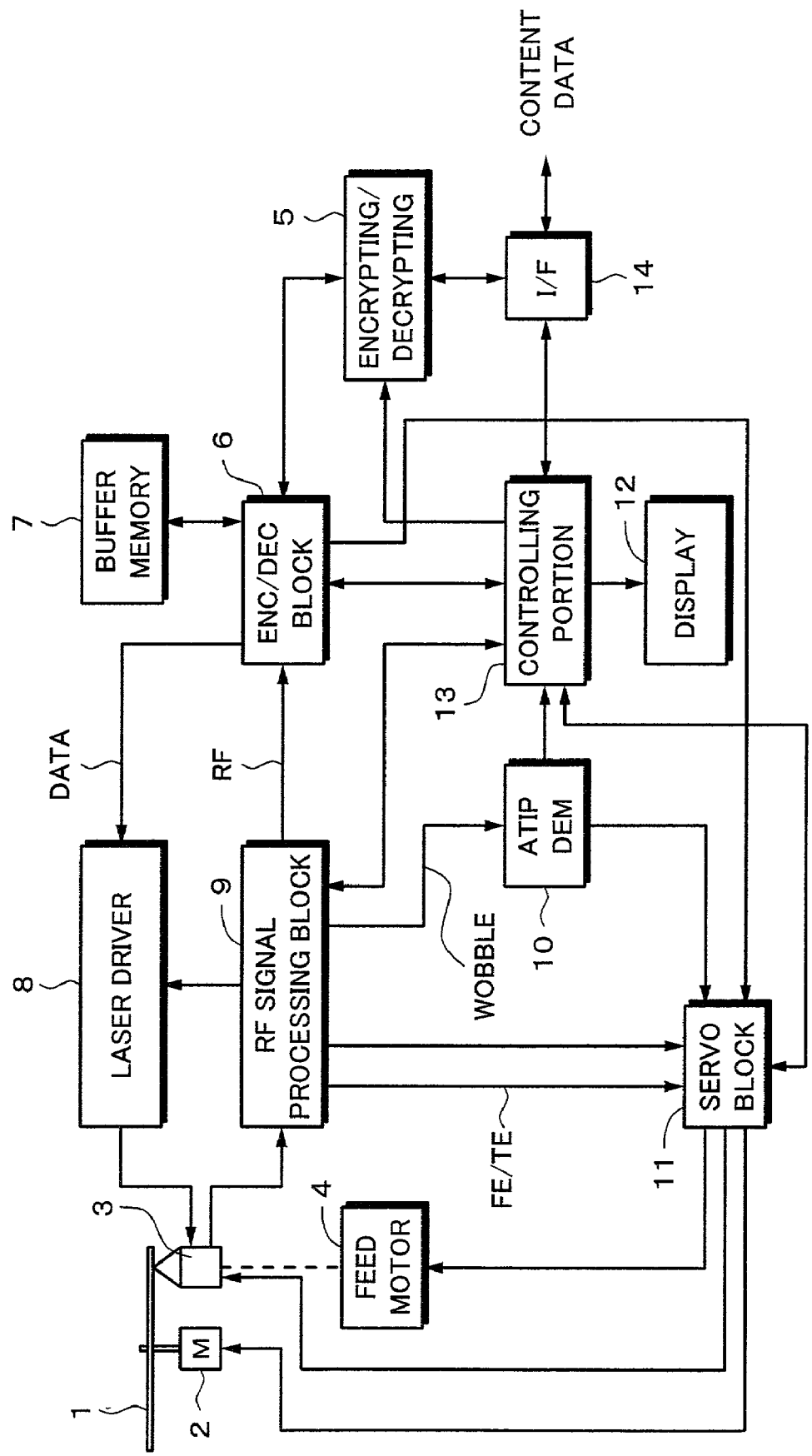
FIG. 1 is a block diagram showing the overall structure of a disc drive according to an embodiment of the present invention.

Next, an embodiment of the present invention will be described. According to the embodiment, the present invention is applied for a CD-RW disc or a CD-R disc. With reference to FIG. 1, an example of a recording and/or reproducing apparatus (hereinafter, simply referred to as drive) for a CD-RW disc will be described. In FIG. 1, reference numeral 1 represents an optical disc—for example CD-RW. The optical disc 1 is rotated at constant linear velocity or constant angular velocity by a spindle motor 2. To record data to the optical disc 1 and read data from the optical disc 1, an optical pickup 3 is disposed. The optical pickup 3 is traveled in the radius direction of the optical disc 1 by a feed motor 4.

The optical disc 1 according to the embodiment is a phase change type disc of which data is recorded by laser light with an output level necessary for recording the data and reproduced corresponding to a change of the amount of laser light reflected by the optical disc 1. The material of a disc substrate on which a record film composed of the phase change record material of the optical disc 1 is coated is for example polycarbonate. By injection forming the polycarbonate, the disc substrate on which track guide grooves called grooves are pre-formed is formed. The grooves formed on the disc substrate are also called pre-grooves because they are pre-formed. A portion between two adjacent grooves is called land. The grooves are successively formed in a spiral shape from the inner periphery to the outer periphery of the optical disc 1. The present invention is not limited to the phase change type discs. Instead, the present invention can be applied for magneto optical discs and write once type discs using an organic coloring matter as a record material as long as they are recordable.

Figure 2:
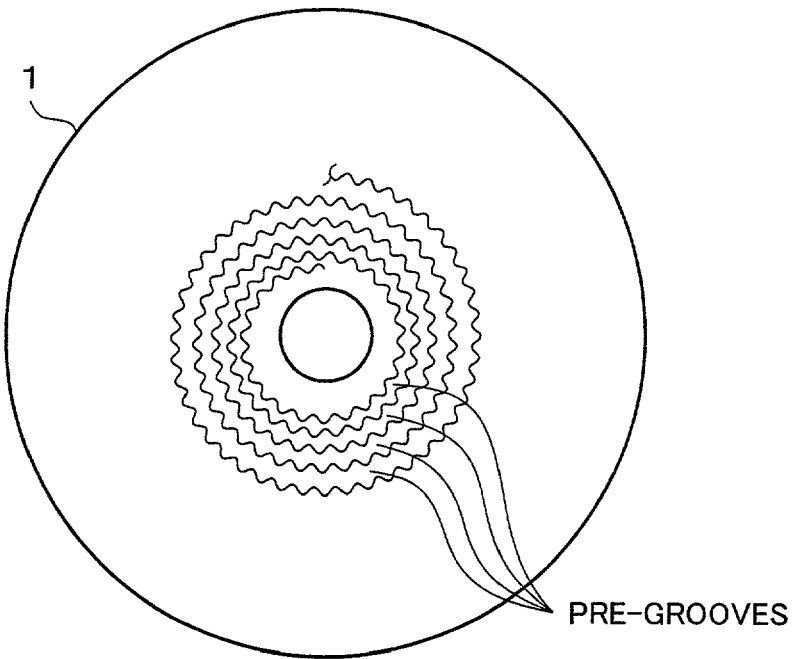
FIG. 2 is a schematic diagram showing wobbled grooves according to the embodiment of the present invention.
Figure 3:
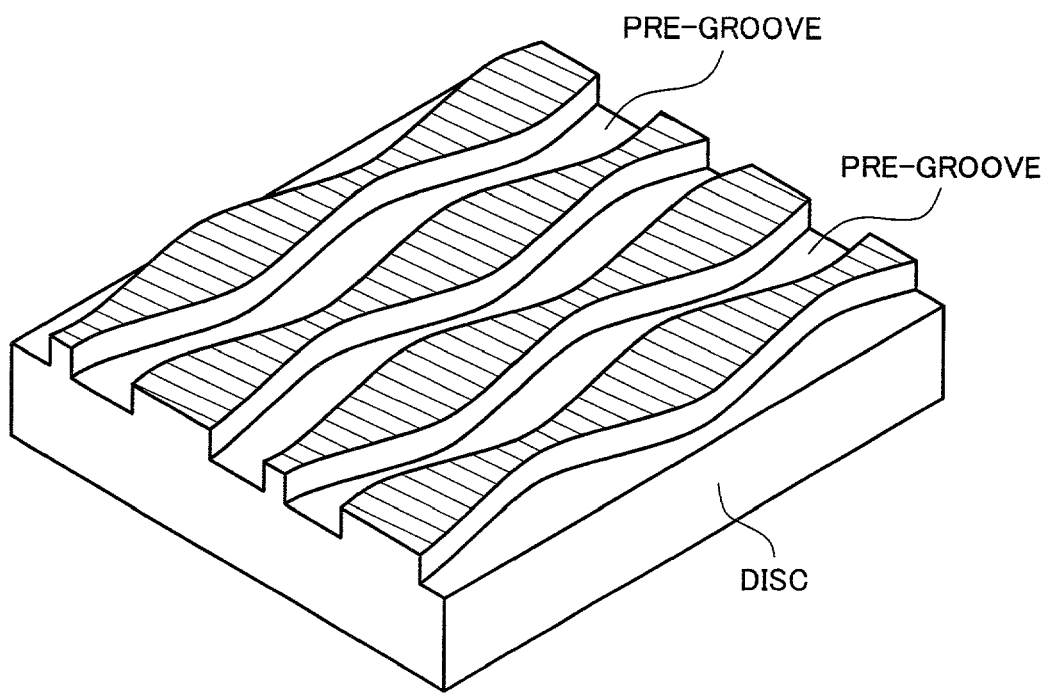
FIG. 3 is a schematic diagram showing enlarged wobbling grooves according to the embodiment of the present invention.

As shown in FIGS. 2 and 3, grooves are wobbled in the radius direction of the optical disc 1 so that they are used for controlling the rotation of the optical disc 1 and used as a reference signal for recording data. Data is recorded in grooves or both grooves and lands. In addition, as wobble information of grooves, absolute time information as address information is successively recorded. In a CD-R disc or a CD-RW disc, with reference to absolute time information as address information extracted as wobble information from grooves, a desired write position of the optical disc 1 is detected. The optical pickup 3 is traveled to the detected write position. Laser right is radiated from the optical pickup 3 to the optical disc 1. As a result, data is written to the optical disc 1.

The optical disc 1 having such wobbled grooves is produced in the following manner. A mastering apparatus radiates laser light to a photo-resist layer coated on an original disc. In addition, the mastering apparatus deflects or swings the laser light in the radius direction of the original disc and thereby forms wobbled grooves that contain address information, clock information, and so forth. The mastering apparatus performs a developing process and an electrically casting process for the photo-resist layer exposed with the radiated laser light and thereby forms a stamper. With the stamper, an injection molding process is performed. As a result, a disc substrate having wobbled grooves is formed. A phase change type record material is coated on the disc substrate by a spattering method or the like. As a result, an optical disc is produced. As will be described later, according to the embodiment of the present invention, in an area for address information, key information necessary for decrypting encrypted data and a version number for managing the key information are recorded.

Returning to FIG. 1, data to be recorded—for example, audio and/or video data—is supplied to the drive through an interface 14. An encrypting/decrypting block 5 is connected to the interface 14. When data is recorded, the encrypting/decrypting block 5 performs an encrypting process for the input data. When data is reproduced, the encrypting/decrypting block 5 performs a decrypting process for data that is read from the optical disc 1. As will be described later, key information necessary for decrypting/encrypting data is supplied from a controlling portion 13. The encrypting/decrypting block 5 is controlled by the controlling portion 13 so that the encrypting/decrypting block 5 does not encrypt data that is not necessary for the encrypting process.

Encrypted data of content that is output from the encrypting/decrypting block 5 is supplied to an encoder/decoder block 6. A buffer memory 7 is connected to the encoder/decoder block 6. The buffer memory 7 stores write data as record data recorded on the optical disc 1 or read data as data that is read from the optical disc 1. The encoder/decoder block 6 converts data that has been encrypted by the encrypting/decrypting block 5—namely, write data as record data—into sectored data. In addition, the encoder/decoder block 6 performs an error correction code encoding process, a modulating process such as EFM modulating process, and a frame synchronous signal adding process for the data. Moreover, the encoder/decoder block 6 adds address data as sub code similar to absolute time information recorded as wobbled grooves to record data. The encoder/decoder block 6 adds the similar address data to the header of the record data.

The framed data supplied from the encoder/decoder block 6—namely, record data—is supplied to a laser driver 8. The laser driver 8 generates a drive signal for recording the record data to the optical disc 1. The drive signal that is output from the laser driver 8 is supplied to a laser diode of the optical pickup 3. Laser light that is modulated corresponding to the drive signal is radiated from the laser diode to the optical disc 1 and recorded as data to the optical disc 1. The laser driver 8 is controlled by an APC (Automatic Power Control) circuit (not shown) disposed in an RF signal processing block 9 so that the output level of laser light radiated from the laser diode of the optical pickup 3 becomes appropriate.

Laser light necessary for reproducing data from the optical disc 1 is radiated from the optical pickup 3 to the optical disc 1. Laser light reflected by the optical disc 1 is detected by a four-divided photo-detector 15 disposed in the optical pickup 3. An output signal of the photo-detector 15 is supplied to an RF signal processing block 9. In the RF signal processing block 9, a matrix amplifier disposed in the RF signal processing block 9 calculates an output signal of the photo-detector 15 in a manner as will be described later and generates an RF signal as a reproduction signal, a wobble signal, a tracking error signal TE, and a focus error signal FE. The RF signal that is output from the RF signal processing block 9 is supplied to the encoder/decoder block 6. A wobble detection signal as a wobbled grove detection signal obtained as a push pull signal is supplied to an ATIP demodulator 10. The tracking error signal and the focus error signal are supplied to a servo block 11.

The encoder/decoder block 6 performs a decoding process such as an EFM demodulating process, an error correction code decoding process (namely, an error correcting process), and a process for disassembling reproduction data into sectored data for the RF signal supplied from the RF signal processing block 9. In the encoder/decoder block 6, the reproduction data is stored to the buffer memory 7. Reproduction data as read data that is read from the buffer memory 7 is output through the interface 14.

Figure 4:
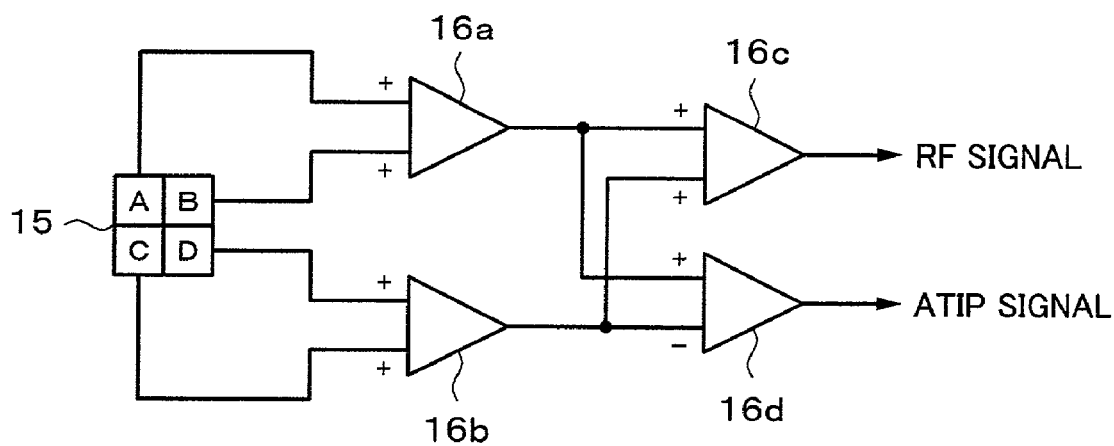
FIG. 4 is a block diagram showing an example of the structure for obtaining wobbling information.

As shown in FIG. 4, output signals of detector portions A and B of the four-divided photo-detector 15 disposed in the optical pickup 3 are added by an adding device 16a. Output signals of detector portions C and D are added by an adding device 16b. An adding device 16c generates an added output signal of the output signals of the four detector portions A, B, C, and D. Namely, the adding device 16c generates the above-described RF signal. A subtracting device 16d generates a difference signal of the added output signal (A+B) of the detector portions A and B and the added output signal (C+D) of the detector portions c and D. In other words, the subtracting device 16d generates a push pull signal. The difference signal is supplied as a wobble detection signal to the ATIP demodulator 10.

The ATIP demodulator 10 supplies the wobble detection signal to an FM demodulator disposed in the ATIP demodulator 10 through a band pass filter that passes only frequencies adjacent to a carrier frequency (22.05 kHz). The FM demodulator outputs a bi-phase signal. A clock signal is extracted from the bi-phase signal that is output from the FM demodulator. The clock signal is used for controlling the spindle motor 2. In addition, with the clock signal, address information is extracted from the bi-phase signal. The address information that is output from the ATIP demodulator 10 is supplied to the controlling portion 13. The controlling portion 13 controls a seek operation of the optical pickup 3 using the address information supplied from the ATIP demodulator 10. The controlling portion 13 is composed of a microcomputer. The controlling portion 13 controls the interface 14, the encrypting/decrypting block 5, the encoder/decoder block 6, the RF signal processing block 9, and the servo block 11. In addition, the drive has a display 12—for example, a liquid crystal display—controlled by the controlling portion 13.

The frame synchronous signal, the tracking error signal TE, and the focus error signal FE extracted from the RF signal supplied from the RF signal processing block 9 and the clock signal supplied from the ATIP demodulator 10 are supplied to the servo block 11. The servo block 11 performs a tracking servo and a focus servo for the optical pickup 3 corresponding to the supplied tracking error signal TE and focus error signal FE. In addition, the servo block 11 performs a spindle servo for the spindle motor 2 corresponding to the frame synchronous signal. Moreover, the servo block 11 performs a thread servo for the feed motor 4 corresponding to a low frequency range signal component of the supplied tracking error signal TE.

The optical disc 1 is for example a CD-R disc or a CD-RW disc. On the optical disc 1, to successively pre-format address information, grooves as guide grooves of laser beams are wobbled in the radius direction of the optical disc 1. Position information as wobble information or absolute time information is successively recorded. On a CD-R/CD-RW disc, with reference to address information obtained as detected wobble information, data is written to the optical disc 1. On a CD-R/CD-RW disc, the address signal is a signal frequency-modulated with a carrier of 22.05 kHz. By demodulating the push pull signal that is output from the RF signal block 9, the address information is obtained. The address information is referred to as ATIP (Absolute Time In Pre-groove) of which an absolute address on the optical disc is represented with absolute time information.

On a CD-R/CD-RW disc, grooves are wobbled by an FM modulation (FSK) of ±1 kHz with a carrier of 22.05 kHz. When the FM modulated signal—namely, a push pull signal that is output from the RF signal processing block 9—is demodulated, a bi-phase signal with a clock of 6.3 kHz is obtained. When the bi-phase signal is demodulated, data of 3150 bits/second is obtained. Since data for one second is equivalent to 75 frames, one frame of ATIP data is composed of 42 bits.

An absolute address represented by absolute time information as address information has a format of minute, second, and frame (MSM format). Decimal numbers of the minute, second, and frame are represented in BCD (Binary Coded Decimal) notation. The absolute time information can represent addresses from 00 minute, 00 second, and 00 frame to 99 minutes, 59 seconds, 74 frames, data for one second being composed of 75 frames. BCD is a method of which one digit of a decimal number is represented with four bits of decimal numbers. The above-described ATIP requires 24 bits. The address representation portion of the ATIP may be represented in binary notation.

Figure 5A:
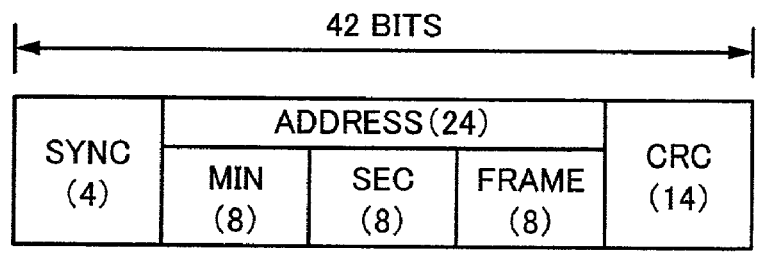
FIGS. 5A and 5B are schematic diagrams showing one example and another example of an address format.

FIG. 5A shows the data structure of one frame of the ATIP of a CD-R disc or a CD-RW disc. The first four bits are used for a synchronous signal. The next 24 bits are used for an address representation portion. The last 14 bits are used for CRC (Cyclic Redundancy Code). The synchronous signal is a unique pattern that does not take place in a bi-phase mark. The three eight-bit portions of the 24 bits represent decimal numbers of minute, second, and frame of address information (time information) in BCD notation. As a result, address information of up to 99 minutes, 59 seconds, 74 frames can be represented. The absolute address information shown in FIG. 5A is equivalent to data of around 900 M bytes assuming that the data amount of one frame is 2 kbytes.

Figure 5B:
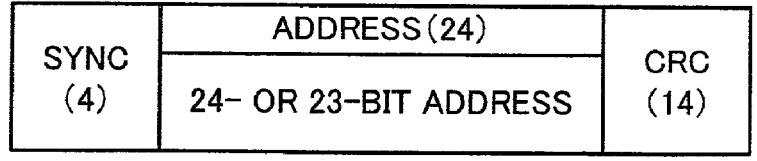

As shown in FIG. 5B, the address representation portion of 24 bits may be represented in binary notation. The binary notation is applied for high record density discs that have larger data record capacities than a CD-R disc and a CD-RW disc. When all 24 bits are used to represent address information in binary notation, since $2^{24}=16777216$, assuming that the data amount of one frame is 2 k bytes, data of up to around 33 Gbytes can be addressed. Thus, this format can be applied for high record density optical discs.

In the format of a CD-R disc and a CD-RW disc, in a combination of high order four bits of each of M, S, and F (those bits are always "0"), other information (not address information) (referred to as extra information) can be represented. As for the most significant bit of M (minute), when M becomes "99", the bit may become "1". However, actually, there are only discs whose record time is 80 minutes or less. Thus, the bit does not become "1". The extra information is recorded in the lead-in area of a CD-R/CD-RW disc. In the program area and the lead-out area, only address information is recorded.

FIG. 6 shows the contents of information represented in combinations of three bits M1, S1, and F1 each of which is the most significant bit of each of MSF. For example, (M1, S1, F1=000) represents an address of the program area and the lead-out area. The most significant bits M1, S1, and F1 and the address (M, S, F) of the program area and the lead-out area of the disc are combined. (M1, S1, F1=100) represents an address of the lead-in area. (M1, S1, F1=101) represents special information 1—for example record power at reference speed. Moreover, additional information 1, additional information 2, and additional information 3 have been defined. In the current format, only the additional information 1 has been defined. Special information has been defined as M1="1", whereas additional information has been defined as M1="0". These special information and additional information are extra information.

In a CD-R disc and a CD-RW disc, a sequence of successive frames in the lead-in area has been defined as shown in FIG. 7. As is clear from FIG. 7, sequences are defined at an interval of 40 frames. At frame numbers N, N+10, and N+20 at intervals of 10 frames, special information 1, special information 2, and special information 3 are placed, respectively. At N+30, additional information 1 is placed. At other frames, regular addresses are placed. Thus, in the lead-in area, (M1="0") takes place once in 40 frames.

According to the embodiment of the present invention, as the additional information 3 defined as (M1, S1, F1=011), identification information for decrypting encrypted data—the identification information is for example generation information of a key (referred to as version number)—is recorded. The identification information is recorded in the stage of the production using the above-described optical disc mastering apparatus. As was described above, 21 bits of the 24-bit area except for M1, S1, and F1 can be used. For example, 16 bits of 21 bits are assigned a version number and the remaining five bits are reserved. According to the embodiment of the present invention, the version number itself is recorded in an absolute address of an optical disc. Alternatively, an encrypted version number may be recorded on an optical disc. The version number itself is a number that varies corresponding to a predetermined rule. For example, the initial version number may be "0". Thereafter, whenever key information is updated, the version number may be incremented by "+1". Alternatively, whenever key information is updated, the version number may be decremented.

The extra information represented by the above-described most significant bits (M1, S1, F1) is required for a high record density disc of which a record capacity of a CD-R disc or a CD-RW disc is extended so as to maintain the compatibility with conventional optical discs. Thus, in a high record density disc, when a predetermined one bit or a plurality of predetermined bits of the 24 bits are predetermined values, they represent an address of the lead-in area and extra information. A total of three bits starting from the most significant bit can be used as (M1, S1, F1) shown in FIG. 6. Thus, even in the binary notation, as was described above, a version number as additional information 3 can be recorded. A version number can be recorded in another record area for example additional information 2.

In addition, the start position of the program area is fixed at a predetermined address. When an address is always a positive value, it is not necessary to record an address of the lead-in area. Thus, as information represented by (M1, S1, F1)=(100), a version number may be recorded.

Figure 8:
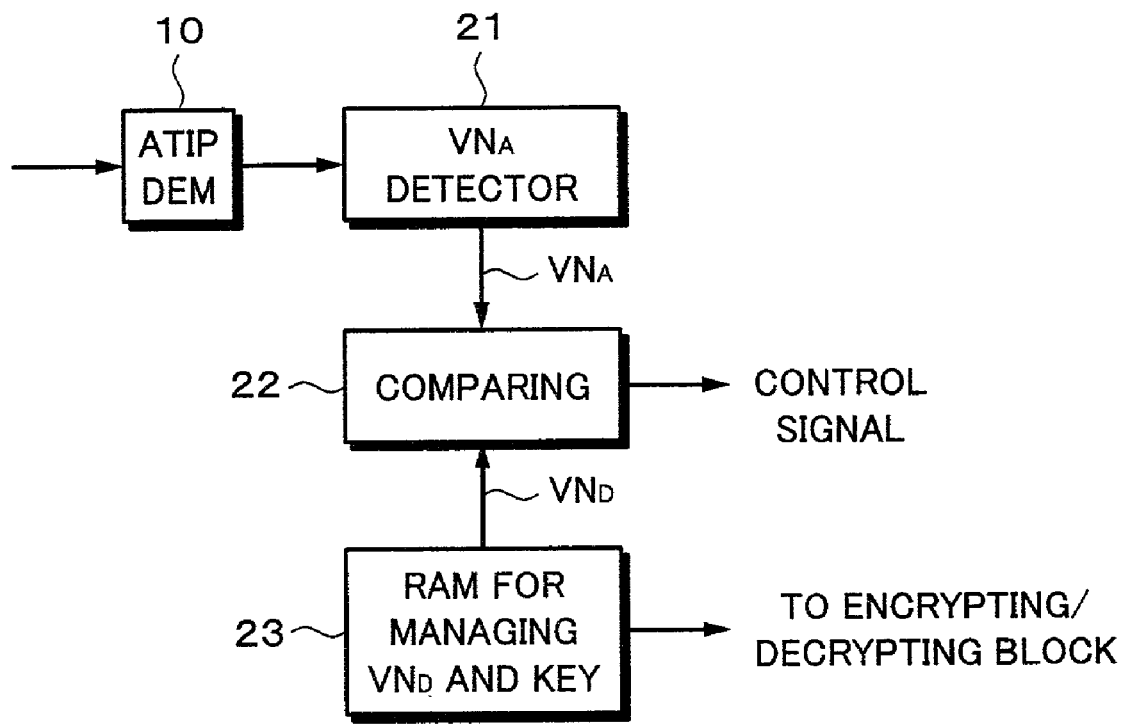
FIG. 8 is a block diagram showing an encrypting function of a controlling portion in a recording mode according to the embodiment of the present invention.

As was described above, with a version number recorded as a part of ATIP that is address information, data of content that is recorded is encrypted. The encrypting process is performed by the controlling portion 13 (see FIG. 1). FIG. 8 is a block diagram showing an encrypting function of the controlling portion 13 performed when data is recorded.

As was described above, address information that is output from the ATIP demodulator 10 contains a version number. A version number recorded as ATIP in the lead-in area of an optical disc is denoted by $VN_A$. When key information is stolen by a hacker, the disc producer changes the version number $VN_A$ of each optical disc. A version number detector 21 detects the version number $VN_A$ from address information supplied from the ATIP demodulator 10.

The version number $VN_A$ detected by the version number detector 21 is supplied to a comparator 22.

In the controlling portion 13, a RAM 23 for managing a version number $VN_D$ and key information of the drive shown in FIG. 1 is disposed. The version number $VN_D$ (of the drive) that is read from the RAM 23 is supplied to the comparator 22. The version number $VN_D$ stored in the RAM 23 is the latest version number. In other words, when data is reproduced from an optical disc on which the latest version number has been recorded, the version number $VN_D$ that is read from the optical disc is supplied to the RAM 23 and then the version number stored therein is updated. As another method for updating a version number, the drive may obtain the latest version number $VN_D$ through a network such as the Internet and store the obtained latest version number to the RAM 23. Alternatively, by reproducing a medium such as a ROM obtained from a retailer with the drive, the latest version number may be obtained and stored to the RAM 23.

As a result of which the version number $VN_A$ is compared with the version number $VN_D$ that is read from the RAM 23, a control signal is output from the comparator 22. The control signal causes a recording operation including an encrypting process to be controlled corresponding to the relation between the version number $VN_A$ and the version number $VN_D$. In addition, key information stored in the RAM 23 is supplied to the encrypting/decrypting block 5. The key information stored in the RAM 23 is managed corresponding to a version number including a generation number. Since it is necessary to decrypt encrypted data of content with key information of a former version, the RAM 23 also store key information of former versions.

Next, with reference to FIG. 9, a recording operation for the optical disc 1 performed by the drive will be described, the recording operation including an encrypting process. At step S1, the optical disc 1 is loaded to the drive. At step S2, in the above-described manner, a wobble detection signal is obtained from a push pull signal. By demodulating the detection signal, absolute time information as address information is read. The version number $VN_A$ is detected from the absolute time information. In reality, the optical pickup 3 is moved to the innermost peripheral area (lead-in area) of the optical disc 1. The focus servo, the tracking servo, and the spindle servo are closed so that the absolute time information as the address information is read. As a result, absolute time information is read from the lead-in area. Data of the absolute time information that has been read is supplied to the controlling portion 13. As shown in FIGS. 5A and 5B, the controlling portion 13 checks the absolute time information with CRC and extracts the version number $VN_A$ from the absolute time information.

At step S3, the version number $VN_D$ of the drive is read from the RAM 23. At step S4, it is determined whether or not the version number $VN_A$ matches the version number $VN_D$ corresponding to the compared result received from the comparator 22. When $VN_A = VN_D$, namely these version numbers match, using key information managed with the version number $VN_D$ that is read from the RAM 23, the encrypting/decrypting block 5 encrypts the data of content and records the encrypted data of content to the optical disc 1 (at step s5).

At step S4, when $(VN_A \ne VN_D)$, the flow advances to step S6. At step S6, it is determined whether or not $(VN_A > VN_D)$. When $(VN_A > VN_D)$, it is clear that the version number $VN_A$ that is read from the optical disc 1 is later than the version number $VN_D$ stored in the RAM 23. In this case, at step S7, the user is requested to update the version number $VN_D$ stored in the RAM 23 to version information that represents the latest generation. In addition, the controlling portion 13 controls the encrypting/decrypting block 5 and the interface 14 so as to cancel the operation for encrypting data with key information managed by the former version number stored in the RAM 23 of the drive and for recording the encrypted data to the optical disc 1. For example, an alarm message that prompts the user to update the version number $VN_D$ is displayed on for example the screen of the display 12. The message is for example "Obtain the key of the latest version number through the Internet", "Load a new ROM disc", or the like. In one of the above-described methods, the user obtains a version number and key information managed therewith, updates the version number $VN_D$ stored in the RAM 23 and the key information, and restores the recording operation of the optical disc 1.

When the determined result at step S6 is NO (namely, $VN_A < VN_D$), the flow advances to step S8. At step S8, using key information managed with the version number $VN_D$ stored in the RAM 23, the data of content as record data is encrypted. The encrypted data of content is recorded. An alarm message that alarms the user of a former version number $VN_A$ of the optical disc 1 may be displayed on the display 12.

The above description focuses on a process for encrypting data of content and recording the encrypted data to the optical disc 1. However, in the reproducing operation, a version number is used. In other words, a version number $VN_A$ that has been read when the optical disc 1 has been loaded to the drive is also used to identify a key for decrypting encrypted data when it is reproduced from the optical disc 1.

In addition, the present invention can be applied for an apparatus dedicated for a reproducing operation, not a recording operation. A version number of key information is read from an optical disc. The version number is compared with a version number of key information of a reproducing apparatus and/or reproduced content. When the version number of the optical disc matches the version number of the apparatus, the apparatus decrypts the encrypted data and reproduces the decrypted data. In contrast, when the version numbers do not match, the apparatus controls a decrypting process in a manner similar to the recoding operation. For example, when the version number of the disc is later than the version number of the reproducing apparatus, the apparatus stops the reproducing operation and outputs a message on the display so as to prompt the user to obtain the latest version number.

In the above description, a version number stored in the memory (RAM) of the disc drive (recording apparatus and/or reproducing apparatus) is used. In addition to the version number of the drive or instead thereof, a version number of data of content may be used. In this case, the version number is added at the beginning of the data of content. For example, data of content received through the network may contain a version number.

In addition, according to the present invention, type information for decrypting (decoding) encrypted data (or compression-encoded) of content may be recorded in addition to a version number. In addition, data of a content may be compressed by a special encoding method and type information that represents the encrypting method may be recorded. In this case, software that represents an encrypting/decrypting method is stored to a memory of for example an encoder/decoder block of the drive instead of key information. In addition, the present invention can be applied for other data record mediums such as memory cards besides optical discs.

According to the present invention, when only key type information is recorded to a data record medium, a key updating process can be performed. According to the present invention, key information is not recorded to a record medium. Instead, key information is stored in a memory of the drive. Key information can be extracted from the type information. If the memory of the drive does not store key information, the drive obtains the key information through the network or the like. Thus, it is not necessary to record the key information itself to the data record medium, the record capacity of the data record medium can be prevented from decreasing.

In addition, according to the present invention, even if a data record medium does not have a ROM portion (read-only area), key type information can be recorded. When a recordable optical disc such as a CD-R disc or a CD-RW disc is used, type information can be recorded as data of address information recorded as wobbling information of grooves.

The invention claimed is:

1. A recording and reproducing method for a record medium, comprising the steps of:
    reading record medium encryption key version information from the record medium when data are recorded to the record medium and reproduced from the record medium on which the record medium encryption key version information has been recorded;
    reading apparatus encryption key version information from a recording and reproducing apparatus for the record medium;
    comparing the record medium encryption key version information read from the record medium with the apparatus encryption key version information read from the apparatus;
    prompting a user to obtain a later generation of encryption key version information when the record medium encryption key version information is a more recent version than the apparatus encryption key version information; and
    performing one of an encrypting and recording process and a decrypting and reproducing process for the record medium using an encryption key corresponding to the apparatus encryption key version information stored in the apparatus when the record medium encryption key version information read from the record medium matches the apparatus encryption key version information read from the apparatus;
    wherein the encryption key is recorded in address information recorded in the record medium; the record medium is a disc-shaped record medium and the address information is recorded in a lead-in area of the disc-shaped record medium;
    wherein the address information is recorded in the record medium such that grooves pre-formed on the disc-shaped record medium are wobbled, and the record medium encryption key version information is embedded at predetermined intervals in the address information.

2. The recording and reproducing method as set forth in claim 1, further comprising the step of:
    determining which of the record medium encryption key version information read from the record medium and the apparatus encryption key version information read from the apparatus is encryption key version information that corresponds to a later generation of encryption key when the record medium encryption key version information read from the record medium does not match the apparatus encryption key version information read from the apparatus.

3. The recording and reproducing method as set forth in claim 2, further comprising the step of:
    canceling the encrypting and recording process and the decrypting and reproducing process when a result of the determining step represents that the record medium encryption key version information read from the record medium is encryption key version information that corresponds to a generation of encryption key later than a generation of encryption key represented by the apparatus encryption key version information read from the apparatus.

4. The recording and reproducing method as set forth in claim 2, further comprising the step of:
    performing the encryption and recording process and the decryption and reproducing process using an encryption key corresponding to the apparatus encryption key version information stored in the apparatus when a result of the determining step represents that the encryption key version apparatus information read from the apparatus is encryption key version information that corresponds to a generation of encryption key later than a generation corresponding to the record medium encryption key version information read from the record medium.

5. The recording and reproducing method as set forth in claim 4, further comprising the step of:
    performing an indication that represents that the record encryption key version information read from the record medium is former encryption key version information.

6. The recording and reproducing method as set forth in claim 1, wherein the encryption key corresponding to the apparatus encryption key version is stored in the apparatus.

7. A recording and reproducing apparatus for a record medium, the apparatus comprising:
    a head portion for scanning the record medium on which record medium type information is recorded;
    a signal processing portion for supplying record data to be recorded on the record medium to the head portion and for performing a decoding process for data read from the record medium by the head portion;
    a storing portion for storing encryption key version information and an encryption key corresponding to the storing encryption key version information;
    a controlling portion for: reading the record medium encryption key version information from the record medium; reading the storing encryption key version information from the storing portion; comparing the record medium encryption key version information read from the record medium with the storing encryption key version information read from the storing portion; and causing the processing portion to perform one of an encryption and recording process and a decryption and reproducing process for the record medium using the encryption key corresponding to the storing encryption key version information stored in the storing portion when the record medium encryption key version information read from the record medium matches the storing encryption key version information read from the storing portion when the data are recorded to the record medium and reproduced from the record medium; and a displaying portion for prompting a user to obtain a later generation of encryption key version information when the record medium encryption key version information is a more recent version than the apparatus encryption key version information;

wherein the encryption key is recorded in address information recorded in the record medium; the record medium is a disc-shaped record medium and the address information is recorded in a lead-in area of the disc-shaped record medium;

wherein the address information is recorded in the record medium such that grooves pre-formed on the disc-shaped record medium are wobbled, and the record medium encryption key version information is embedded at predetermined intervals in the address information.

8. The recording and reproducing apparatus as set forth in claim 7, wherein said controlling portion includes:

a comparing portion for comparing the record medium encryption key version information read from the record medium with the storing encryption key version information read from the storing portion.

9. The recording and reproducing apparatus as set forth in claim 7, wherein the controlling portion determines which of the record medium encryption key version information read from the record medium and the storing encryption key version information read from the storing portion is encryption key version information that corresponds to a later generation of encryption key when the record medium encryption key version information read from the record medium encryption key version information read from the record medium does not match the storing encryption key version information read from the storing portion.

10. The recording and reproducing apparatus as set forth in claim 9, wherein the controlling portion causes the signal processing portion to cancel the process when the record medium encryption key version information read from the record is encryption key version information that corresponds to a generation of encryption key later than a generation of encryption key corresponding to the storing encryption key version information read from said storing portion.

11. The recording and reproducing apparatus as set forth in claim 9, wherein the controlling portion causes the signal processing portion to perform the process using an encryption key corresponding to the storing encryption key version information stored in the storing portion when the storing encryption key version information read from the storing portion is encryption key version information that corresponds to a generation of encryption key later than a generation corresponding to the record medium encryption key version information read from the record medium.

12. The recording and reproducing apparatus as set forth in claim 11, the apparatus further comprising:

a displaying portion, wherein the controlling portion causes the displaying portion to perform an indication that represents that the record medium encryption key version information read from the record medium is former encryption key version information.

13. A recording and reproducing method for a record medium, comprising the steps of:

reading record medium encryption key version information corresponding to an encryption key from the record medium when data are one of recorded to the record medium and reproduced from the record medium on which the encryption key version information corresponding to the encryption key is recorded;

reading apparatus encryption key version information corresponding to encryption key from a recording and reproducing apparatus for the record medium;

comparing the record medium encryption key version information read from the record medium with the apparatus encryption key version information read from the apparatus;

prompting a user to obtain a later generation of encryption key version information when the record medium encryption key version information is a more recent version than the apparatus encryption key version information; and controlling one of a recording operation and a reproducing operation correspondence to a compared result of the comparing step;

wherein the encryption key is recorded in address information recorded in the record medium; the record medium is a disc-shaped record medium and the address information is recorded in a lead-in area of the disc-shaped record medium;

wherein the address information is recorded in the record medium such that grooves pre-formed on the disc-shaped record medium are wobbled, and the record medium encryption key version information is embedded at predetermined intervals in the address information.

14. The recording and reproducing method as set forth in claim 13, further comprising the step of:

encrypting and recording data to the record medium and decrypting and reproducing data from the record medium using the encryption key corresponding to the apparatus encryption key version information stored in the apparatus when the record medium encryption key version information read from the record medium matches the apparatus encryption key version information read from the apparatus.

15. The recording and reproducing method as set forth in claim 14, further comprising the step of:

determining which of the record medium and the apparatus encryption key version information read from the apparatus is encryption key version information that corresponds to a later generation of encryption key when the record medium encryption key version information read from the record medium does not match the apparatus encryption key version information read from the apparatus.

16. The recording and reproducing method as set forth in claim 15, further comprising the step of:

canceling the recording process and the reproducing process when a result of the determining step represents that the record medium encryption key version information read from the record medium is encryption key version information that represents a generation later than a generation represented by the apparatus encryption key version information read from the apparatus.

17. The recording and reproducing method as set forth in claim 15, further comprising the step of:

performing the encryption and recording process and the decryption and reproducing process using the encryption key corresponding to the apparatus encryption key version information stored in the apparatus when a result of the determining step represents that the appa ratus is encryption key version information that corresponds to a generation of encryption key later than a generation of encryption key corresponding to the record medium encryption key corresponding to the record medium encryption key version information read from the record medium.

18. The recording and reproducing method as set forth in claim 17, further comprising the step of:

performing an indication that represents that the record medium encryption key version information read from the record medium is former encryption key version information.

* * * * *